United States Patent

Cheung

[11] Patent Number: 5,161,458
[45] Date of Patent: Nov. 10, 1992

[54] APPARATUS FOR FORMING FILLED DOUGH PRODUCTS

[76] Inventor: Yau T. Cheung, 2348 S. Canal, Chicago, Ill. 60616

[21] Appl. No.: 737,428

[22] Filed: Jul. 29, 1991

[51] Int. Cl.$^5$ .......................... A21C 9/00; A21C 9/06; A21C 11/00
[52] U.S. Cl. .................. 99/450.6; 99/450.1; 99/450.7
[58] Field of Search .............. 99/450.1, 450.2, 450.6, 99/450.7, 352, 353, 494; 425/110, 112, 383, 324.1; 426/297, 502

[56] References Cited

U.S. PATENT DOCUMENTS

| | | |
|---|---|---|
| 3,633,517 | 1/1972 | Kao . |
| 3,782,272 | 1/1974 | Cooper .................. 99/450.6 |
| 3,793,938 | 2/1974 | Haas ..................... 99/450.7 |
| 3,901,137 | 8/1975 | Jimenez ................... 9/353 |
| 3,912,433 | 10/1975 | Ma . |
| 3,930,440 | 1/1976 | Ohkawa . |
| 3,946,656 | 3/1976 | Hai . |
| 4,047,478 | 9/1977 | Trostmann et al. . |
| 4,084,493 | 4/1978 | Quintana . |
| 4,313,719 | 2/1982 | Lundgren . |
| 4,388,059 | 6/1983 | Ma . |
| 4,439,124 | 3/1984 | Watanabe . |
| 4,515,819 | 5/1985 | Shinriki ................. 426/297 |
| 4,516,487 | 5/1985 | Madison et al. . |
| 4,517,785 | 5/1985 | Masuda . |
| 4,591,328 | 5/1986 | Cheung . |
| 4,608,918 | 9/1986 | Funabashi et al. ........... 99/450.6 |
| 4,608,919 | 9/1986 | Prows et al. . |
| 4,913,043 | 4/1990 | Cheung . |
| 5,012,726 | 5/1991 | Fehr et al. ................. 99/494 |

FOREIGN PATENT DOCUMENTS 45-21620 7/1970 Japan .................. 99/450.6

Primary Examiner—Timothy F. Simone
Attorney, Agent, or Firm—Kinzer, Plyer, Dorn, McEachran & Plyer

[57] ABSTRACT

An apparatus for forming filled dough products. The apparatus includes a first belt conveyor and a second belt conveyor located below and at the end of the first belt conveyor. A first air jet stream is discharged through a thin rectangular orifice against the underside of a sheet of dough carrying a cylindrical filling as the sheet of dough leaves the first belt conveyor to support the leading edge of the sheet of dough. A deflector engages the leading edge of the sheet of dough to bend the corner thereof upwardly. A second air jet stream discharges through a thin rectangular orifice against the sheet of dough to reversely fold the leading corner of the sheet of dough against the cylindrical filling and also bends the trailing edge of this sheet of dough onto the second conveyor belt after the sheet of dough and the filling have dropped to the second belt conveyor. Rollers crease the sheet of dough outwardly of the cylindrical filling. A third air jet stream discharges through perforations positioned on opposite sides of the second belt conveyor to lift the opposite corners of the sheet of dough about the creases and to fold the corners inwardly over the filling. A paddle blade creases the folded dough rearwardly of the filling. An overhead belt conveyor moving opposite to the second belt conveyor completes the rolling of the dough and filler.

3 Claims, 2 Drawing Sheets

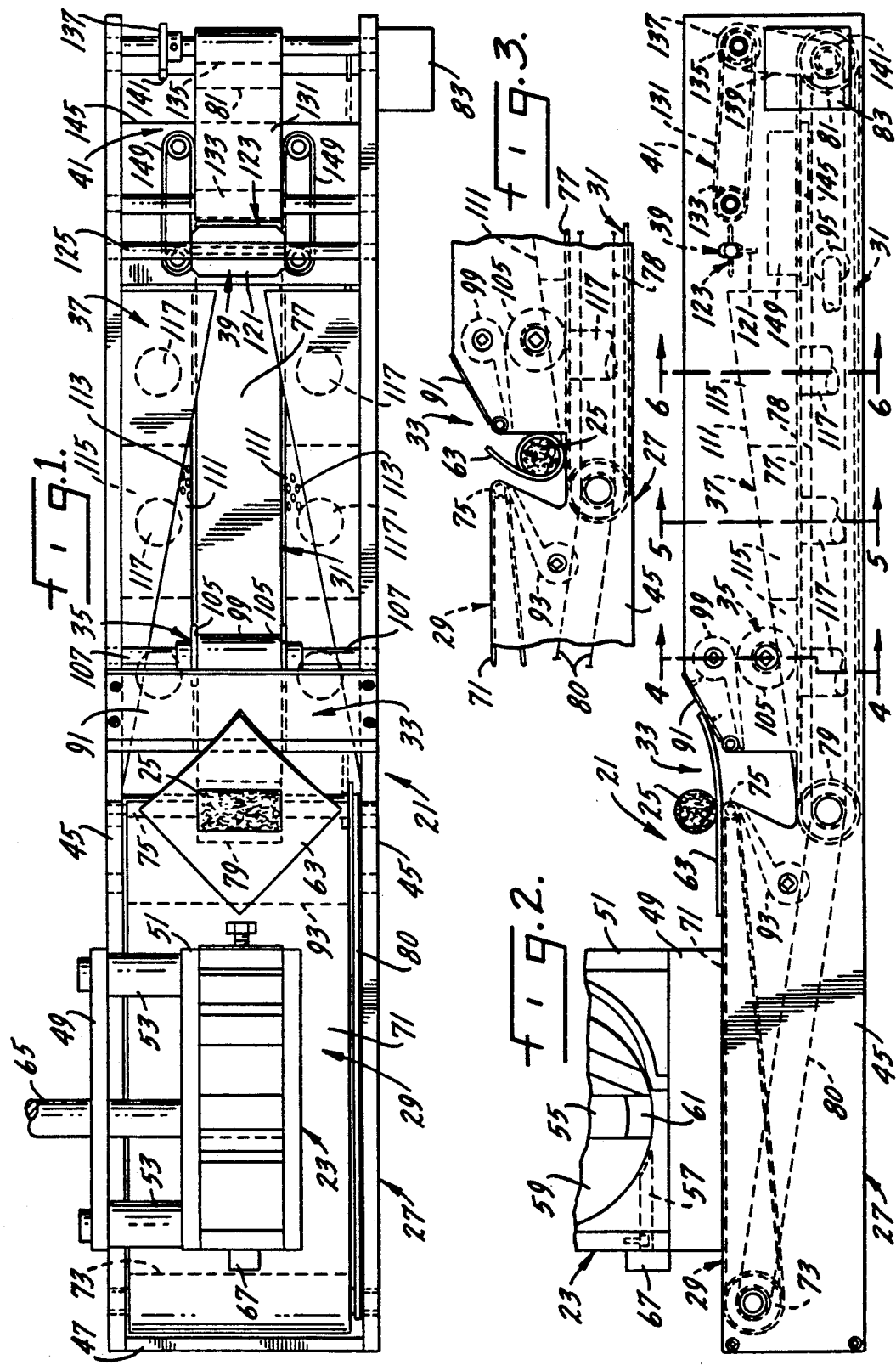

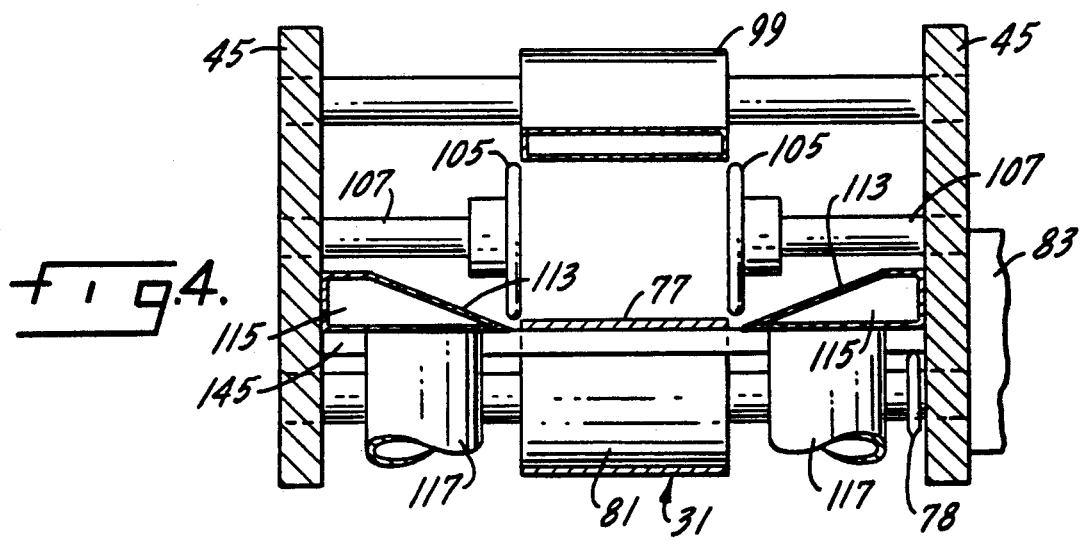
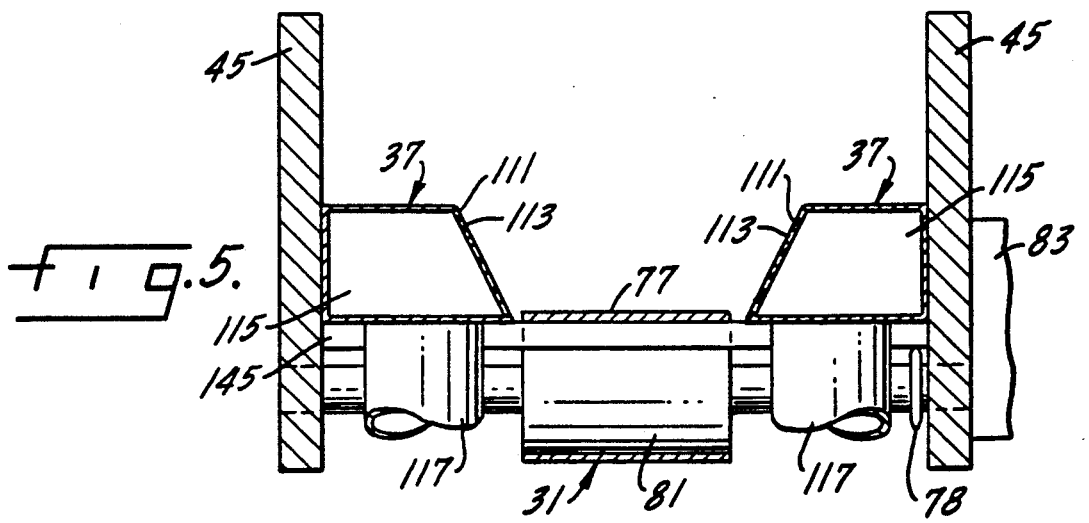
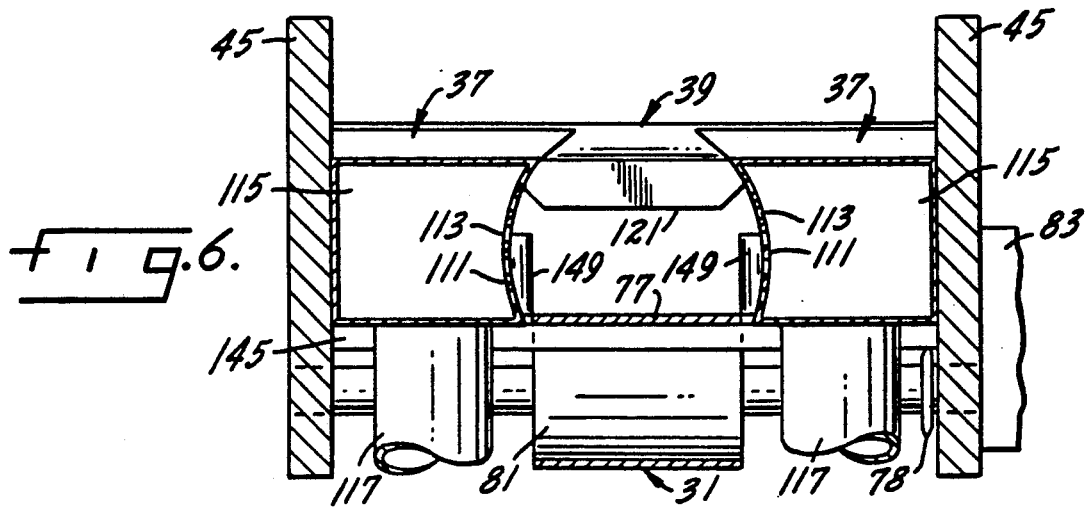

APPARATUS FOR FORMING FILLED DOUGH PRODUCTS

BACKGROUND AND SUMMARY OF THE INVENTION

I have described a method and disclosed apparatus for the continuous manufacture of traditionally shaped egg rolls in my U.S. Pat. No. 4,913,043, which patent is incorporated into this specification by reference. Further, I have disclosed an apparatus for molding egg roll fillings in my copending U.S. patent application Ser. No. 07/588,541, filed Sep. 25, 1990, which application is also incorporated by reference into this specification.

An object of my present invention is an apparatus which efficiently combines the egg roll filling molding function of my aforementioned patent application with the egg roll manufacturing function of my aforementioned issued patent to maximize the output of traditionally shaped egg rolls.

Another object of my invention is an apparatus for the continuous manufacture of traditionally shaped egg rolls which is economical to manufacture and easy to clean and maintain.

Yet another object of my invention is a simplified apparatus for rolling a sheet of dough around a cylindrical egg roll filling.

Still another object of my invention is a simplified apparatus for folding the corners of a sheet of dough inwardly over a cylindrical egg roll filling.

Other objects will become apparent from the following specification, claims and drawings.

BRIEF DESCRIPTION OF THE DRAWINGS

The invention is illustrated more or less diagrammatically in the following drawings wherein:

FIG. 1 is a top plan view of an apparatus of my invention, with some parts broken away and others shown in hidden lines;

FIG. 2 is a side elevational view of the apparatus of FIG. 1, with some parts broken away and others shown in hidden lines;

FIG. 3 is a partial, side elevational view of the apparatus of FIG. 2 showing a further step in the rolling of a sheet of dough around a cylindrical egg roll;

FIG. 4 is an enlarged, cross-sectional view taken along line 4—4 of FIG. 2;

FIG. 5 is an enlarged, cross-sectional view taken along line 5—5 of FIG. 2; and

FIG. 6 is an enlarged, cross-sectional view taken along line 6—6 of FIG. 2.

DESCRIPTION OF THE PREFERRED EMBODIMENT

An apparatus 21 for forming the egg rolls in accordance with the teachings of this invention is shown in FIGS. 1-6 of the drawings. The apparatus includes a molding apparatus 23 for forming cylindrical egg roll fillings 25. The molding apparatus 23 is a somewhat modified form of the molding apparatus shown in FIGS. 1-9 of my pending and allowed U.S. patent application Ser. No. 07/588,541, filed Sep. 25, 1990. The apparatus 21 includes a framework 27 which is designed to be supported on a table or other support, which may be conventional and, therefore, is not shown for simplicity of illustration and explanation. The material of the framework 27 is usually a suitable metal such as stainless steel of the type which is approved for use in the food processing industry.

Mounted on the framework 27 is a first belt conveyor means 29 which extends the width of the framework and which is positioned at the top thereof and a second conveyor belt means 31 having a width approximately one-third of the width of the framework and extending longitudinally along the center line of the framework at a level below the level of the first conveyor belt means 29. A dough sheet folding means 33 is positioned between said first and second conveyor belt means. A mechanism 35 for providing creases on opposite sides of the sheet of dough in the direction of the length of travel of the sheet of dough along the conveyor belts is positioned near the beginning of the second conveyor belt means. A dough sheet corner folding means 37 is positioned on opposite sides of the second conveyor belt means 31 generally downstream of the first conveyor belt means 29. A transverse creasing means 39 for the sheet of dough is located downstream of the dough corner folding means 37 and a finished egg roll rolling and tightening means 41 is located at the downstream end of the second conveyor belt means 31.

The functions formed by the apparatus 21 of this invention are essentially the same as the functions performed by the apparatus 41 shown in my U.S. Pat. No. 4,913,043 but the apparatus 21 of this invention is constructed in a simpler and more efficient manner than the apparatus of my '043 patent.

The framework 27 includes side beams 45 and an end beam 47. The side beams and the end beam are bolted together. Of course, it should be understood and appreciated that other means of attachment, such as welding or the like, may be used instead of or in addition to the bolting. An upstanding plate 49 attached to one of the side beams 45 supports the filler molding mechanism 23 so that its mold housing 51 is centered above the first conveyor belt means 29, as shown most clearly in FIG. 1 of the drawings. The mold housing 51 is properly positioned by spacers 53 which are attached to the plate 49.

The filler molding mechanism 23 shown herein is similar to the device shown in FIGS. 1-9 of my previously mentioned patent application, but with some modifications which make it better suited to function as an integral part of the apparatus 21 of this invention. The modifications include the pistons 55 which are provided with convex ends. A scraper 57 is attached to an end wall of the molding housing 51 so that it engages the rotor 59 downstream of its discharge so that an egg roll filling 25 will be positively removed from the cavity 61 of the rotor and deposited on a square sheet 63 of dough which has been placed on the first conveyor belt means 29 at the upstream end thereof. The rotor 59 is driven by a shaft 65 connected to a suitable drive motor, which is not shown. An electric eye sensing device 67 is mounted on a wall of the mold housing to detect the placing of a sheet 63 of dough on the first conveyor belt means. The electric eye controls the timing of the discharge of egg roll filling 25 from the molding mechanism 23.

As is conventional, and as is shown in the drawings, the square sheet 63 of dough is positioned with a corner pointed in the direction of movement or, in other words, downstream of the first conveyor belt means 29. As is also conventional, the trailing edge of the sheet 63 of dough may be sprayed or brushed with a whole egg and water mixture for increase adhesion. Such a sheet of dough is approximately six inches in length on each side. The cylindrical egg roll filler 25 is dropped on the sheet 63 of dough at approximately the center thereof, as shown in FIGS. 1 and 2 of the drawings.

The first conveyor belt means 29 includes a conveyor belt 71 which is driven by a roller 73 at its upstream end and has a smaller idler roller 75 at its downstream end. The second conveyor belt means 31 includes a conveyor belt 77 which is approximately one-third the width of the belt 71, with the upstream end of the belt 77 located beneath the idler roller 75 at the downstream end of belt 71. The roller 79 at the upstream end of conveyor belt 77 is driven by a chain 78 and in turn drives the roller 73 at the upstream end of the first conveyor belt means by means of a chain 80 so that both conveyor belts 71 and 77 move at the same linear speed. The conveyor belt 77 is driven by a roller 81 at its downstream end which in turn is driven by an electric motor 83 through a suitable gear arrangement, which is not shown in the drawings for clarity of illustration. The conveyor belts 71 and 77 may be constructed of a synthetic canvas-like material of the type suitable for use in the food processing industry.

The dough sheet folding means 33 functions to reversely fold the leading corner of the sheet of dough 63 around the cylindrical egg roll filler 25. This mechanism includes a deflector in the form of a plate 91 which is located downstream of the downstream end of the conveyor belt 71. The deflector plate 91 is supported on the side beams 45 of the framework 27 and inclined in an upwardly direction so as to bend the leading corner of the sheet of dough 63 in an upward direction, as shown in FIG. 2 of the drawings. To prevent the leading corner of the sheet 63 of dough from falling downwardly as it passes over the idler roller 75 at the downstream end of the conveyor belt 71, a first air jet means 93 discharges air under pressure through a thin rectangular nozzle orifice against the underside of the sheet of dough, in an upward direction shown in FIG. 2 of the drawings, to support the corner until it engages the deflector plate 91. The first air jet means 93 has a thin elongated, rectangular orifice which extends the width of the conveyor belt 71 and directs a stream of air rearwardly and upwardly from beneath the idler roller 75, as shown in the drawings. The air for the first air jet means 93 may be supplied from a blower 95 or any other conventional source of air under pressure. While the first air jet means 93 provides an air stream of sufficient force to prevent the leading corner of the sheet 63 of dough from falling onto the belt 77 of the second conveyor means 31, the force is not sufficient to also support the cylindrical egg roll filling 25. When the cylindrical egg roll filling 25 reaches the downstream end of the conveyor belt 71, it will drop onto the second conveyor belt means 31 bringing the sheet of dough 63 down with it.

A second air jet means 99 is located beneath the deflector 91 and discharges a stream of air in an upstream direction through a thin rectangular orifice towards the first conveyor belt means 29. The stream of air will engage the leading edge of the sheet 63 of dough and force it to reversely fold around the cylindrical filling 25 in the manner shown in FIG. 3 of the drawings. The stream of air will also bend the trailing edge of the sheet 63 of dough downwardly into contact with the second conveyor belt 77. The dough sheet folding means 33 described herein functions to achieve the same results as the dough deflector 101 which is shown and described in my aforementioned '043 patent. The sheet 63 of dough and the filling 25 are now in approximately the same condition as the sheet and filling shown in FIG. 1C of my '043 patent. The stream of air under pressure from the second air jet means is directed through a thin rectangular orifice (not shown) which extends across the width of the conveyor belt 77. This air may be supplied under pressure from a blower or any other conventional source of air under pressure.

The longitudinal creasing means 35 provides creases in the sheet 63 of dough on opposite sides of the cylindrical egg roll filling 25. The creases are created by a pair of rollers 105 engaging the sheet of dough. Each roller 105 is mounted on a fixed stub shaft 107 extending inwardly from a side beam 45 of the framework 27. These rollers are not powered but are rotated by engagement with the sheet 63 of dough as it moves along on the conveyor belt 77 of the second conveyor belt means 31. The purpose for a longitudinally-extending crease in the sheet 63 of dough on each side of the filler 25 is to facilitate the folding of the corners of the sheet of dough over the filler.

The folding of the corners of the sheet 63 of dough is accomplished by means 37 which consists of an upwardly and outwardly inclined and inwardly flaring wall 111 located on each side of the conveyor belt 77. In addition to being inclined upwardly and outwardly, the walls 111 converge in the downstream direction of movement of the conveyor belt 77 and provide a concave face to the conveyor belt 77 near the discharge end thereof, as shown in FIG. 6 of the drawings. Air discharge openings 113 in the form of small perforations are provided in the inclined and concave wall 111 for the exit of air under pressure. The pressurized air is supplied to chambers 115 located under the inclined and concave walls 111 and which in turn are supplied through ducts 117 by a source of air under pressure, preferably the same source which supplies the first air jet means 93 and second air jet means 99. The jets of air exhausting from the openings 113 slightly lift the corners of the sheet 63 of dough and cooperate with the concave curvature of the walls 111 to fold these corners over the egg roll filling 25 and reduce friction between the sheet of dough and the walls 111.

The transverse creasing mechanism 39 forms a transverse crease in the sheet 63 of dough immediately rearwardly of the filling 25. This crease line is formed by one of the blades 121 formed as part of a free-wheeling paddle 123 which is mounted on a shaft 125 extending across the framework 27 of the apparatus 21. The contact of one of the blades 121 with the sheet 63 of dough completes the folding of the corners and tightens the engagement of the folded leading corner of the sheet of dough with the filling 25.

In order to complete the folding and rolling of the sheet of dough to obtain the final egg roll shape product 37 of my '043 patent, a rolling and tightening means 41 is provided. This means 41 includes an overhead conveyor belt 131 located immediately downstream of the paddle 123. The overhead conveyor belt 131 is made of a rubberized material with a roughened gripping surface to engage the covering 63 of the egg roll filling 25. The direction of movement of the lower run of this conveyor is opposite to the direction of movement of the upper run of conveyor belt 77. The linear speed of the belt 131 may be approximately one-half the speed of the belt 77, but this is adjustable. The belt 131 is supported on a forward roller 133 and a rearward roller 135. The rearward roller 135 has a gear 137 driven by a chain 139 which meshes with a gear 141 on the shaft of roller 81 of the second conveyor belt means 31. The gear 137 has a larger diameter than the gear 141 so that the conveyor belt 131 runs at a slower speed than the conveyor belt 77. The conveyor belt 131 is declined from its upstream end to its downstream end and is positioned above the belt 77 a sufficient distance so that it engages a completely folded and partially rolled dough and filling to complete the rolling to the traditional egg roll shape 37 of my '043 patent.

The belt 77 is supported by a plate 145 form the paddle 123 downstream for a substantial distance under the reverse rolling conveyor 131. On opposite sides of the belt 77, extending downstream from the paddle 123, are retainer conveyor belts 149. The function of these retainer conveyor belts is to prevent the partially rolled dough and filling from falling off the belt 77.

While one particular embodiment of the apparatus for practicing my invention has been shown and described, it will be obvious to those skilled in the art that changes and modifications may be made without departing from the invention and, therefore, the purpose of the appended claims is to cover all such changes and modifications which fall within the scope of my invention.

Also, while the invention has been described for use in forming egg rolls, it should be appreciated that other items can be formed using the apparatus of my invention. Therefore, it should be appreciated that the present apparatus of my invention can be used to form other egg rolls into their desired shape and is not limited to egg rolls.

I claim:

1. An apparatus for forming a food item such as a traditionally shaped egg roll, including:
    a first conveyor belt means for receiving and supporting a square sheet of dough and a cylindrical egg roll filling positioned on said dough and moving them on the first conveyor means with one corner of the sheet of dough pointed in the direction of movement of said first conveyor belt means,
    a second conveyor belt means located at a lower level than first conveyor belt means and moving in the same direction of travel as said first belt means,
    said first conveyor belt means terminating downstream at a location beyond the upstream end of said second conveyor means so that the sheet of dough and the cylindrical egg roll filling will discharge from said first conveyor belt means and be received by said second conveyor belt means,
    first air jet means discharging in the direction of movement of said first conveyor belt means and against the underside of the sheet of dough as it leaves said first conveyor belt means to thereby support the leading corner of the sheet of dough as it moves off said first conveyor belt means,
    a deflector located downstream of said first conveyor belt means and positioned to engage the leading corner of said square sheet of dough as said square sheet of dough leaves said first conveyor belt means and to bend said corner upwardly,
    second air jet means discharging in a direction opposite to the direction of movement of said square sheet of dough to engage and thereby reversely fold the bent leading corner of said square sheet of dough against said cylindrical egg roll filling and bend down the trailing edge of the sheet of dough after the sheet of dough and the egg roll filling have dropped from the downstream end of said first conveyor belt means onto said second conveyor belt means,
    means to crease the square sheet of dough along its length of movement immediately outwardly of the ends of the cylindrical egg roll filling,
    third air jet means positioned on opposite longitudinal sides of said second conveyor belt means to lift the opposite corners of the square sheet of dough which are located outwardly of the creases and to fold them inwardly over the cylindrical egg roll filling,
    paddle means to transversely crease the folded dough rearwardly of the cylindrical egg roll filling, and
    means to roll the cylindrical egg roll filling in the direction opposite the direction of movement of the second conveyor belt means to fold the side and trailing corners of the sheet of dough into the traditional cylindrical egg roll shape.

2. An apparatus for folding an edge of a sheet of dough over a cylindrical filling to substantially encircle the cylindrical filling with dough, including:
    a first conveyor for moving a sheet of dough carrying a cylindrical filling over a defined path with said first conveyor having a downstream end,
    a second conveyor having an upstream end positioned below said downstream end of said first conveyor,
    an upwardly inclined deflector positioned downstream of said downstream end of said first conveyor to receive the leading edge of the sheet of dough and bend it upwardly,
    a first air jet means to discharge air against the underside of said sheet of dough as it leaves said downstream end of said first conveyor to support the leading edge of said sheet until said cylindrical filling leaves the downstream end of said first conveyor, and
    a second air jet means to discharge air against the underside of said leading edge of said sheet of dough to reversely fold said leading edge against said cylindrical filling to encircle said cylindrical filling with said sheet of dough and to bend down the trailing edge of the sheet of dough as said sheet of dough and said cylindrical filling falls onto said second conveyor.

3. An apparatus for folding the corners of a square sheet of dough over a cylindrical filling positioned on the sheet of dough, including:
    a narrow conveyor belt supporting the square sheet of dough and cylindrical filling with opposite corners of the sheet of dough extending laterally beyond the conveyor belt,
    a supporting and bending means for the laterally extending corners of said sheet of dough positioned on each side of said narrow conveyor belt, said supporting and bending means including:
    an upwardly and outwardly inclined wall positioned on each side of said conveyor belt,
    said walls converging and curving inwardly in the downstream direction of movement of said conveyor belt,
    a plurality of openings in said walls for the passage of air under pressure to direct said pressurized air to lift said laterally-extending corners of said sheet of dough and fold them over said cylindrical filling, and
    means to supply air under pressure.

* * * * *